United States Patent [19]

Hart, Jr.

[11] Patent Number: 4,911,296

[45] Date of Patent: Mar. 27, 1990

[54] UTILITY CHEST FOR VEHICLES

[76] Inventor: Charles R. Hart, Jr., 919 Santa Monica Blvd., Suite 300, Santa Monica, Calif. 90406

[21] Appl. No.: 337,310

[22] Filed: Apr. 13, 1989

[51] Int. Cl.$^4$ .............................................. B65D 85/00
[52] U.S. Cl. ................................... 206/373; 206/803; 220/22
[58] Field of Search ............... 206/434, 372, 373, 223, 206/803; 211/74, 76; 220/22; 312/DIG. 33, 290, 324, 214; 296/37.1

[56] References Cited

U.S. PATENT DOCUMENTS

| | | | |
|---|---|---|---|
| 527,339 | 10/1894 | Lins | 296/37.1 |
| 869,156 | 10/1907 | Barry | 206/803 |
| 1,514,885 | 11/1924 | Bigler | 206/373 |
| 1,520,444 | 12/1924 | Romadka | 206/803 |
| 1,644,830 | 10/1927 | Henderson | 206/803 |
| 1,727,235 | 9/1929 | Joyse, Jr. | 206/803 |
| 2,252,235 | 8/1938 | Snelling | 211/74 |
| 2,739,863 | 3/1956 | Ferris | 312/290 |
| 3,926,308 | 12/1975 | Sullivan | 206/372 |
| 4,084,865 | 4/1978 | Joyce | 312/DIG. 33 |
| 4,085,961 | 4/1978 | Brown | 312/DIG. 33 |
| 4,303,158 | 12/1981 | Perkins | 206/803 |
| 4,437,568 | 3/1984 | Hamblin | 206/223 |
| 4,821,874 | 4/1989 | Uhlig | 206/434 |
| 4,832,193 | 5/1989 | Kime | 206/372 |

FOREIGN PATENT DOCUMENTS

| | | | |
|---|---|---|---|
| 1027919 | 4/1976 | Canada | 206/803 |
| 1200846 | 8/1970 | United Kingdom | 220/22 |

*Primary Examiner*—Paul T. Sewell
*Assistant Examiner*—David Jenny
*Attorney, Agent, or Firm*—Kelly, Bauersfeld & Lowry

[57] ABSTRACT

A utility chest is provided for compact and safe storage of emergency supplies within the trunk of a standard passenger vehicle or the like. The utility chest comprises a main storage compartment which is subdivided by upright partitions into a plurality of individual subcompartments for receiving and storing emergency supply items such as fuel, oil, coolant, etc. A lower auxiliary compartment is adapted to receive a shallow drawer having tools and the like stored therein. In addition, a hinged lid for the utility chest desirably includes spring clip fasteners or the like at the underside thereof for supporting individual emergency supply items, such as safety fares.

17 Claims, 2 Drawing Sheets

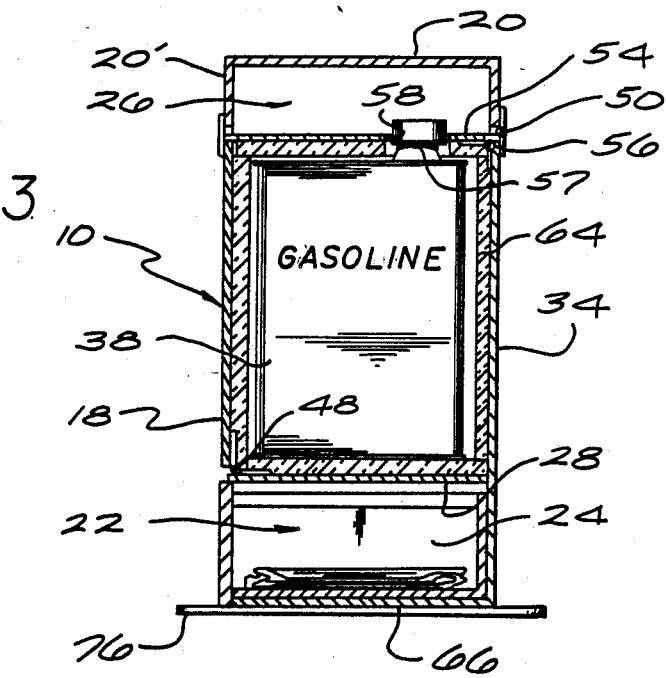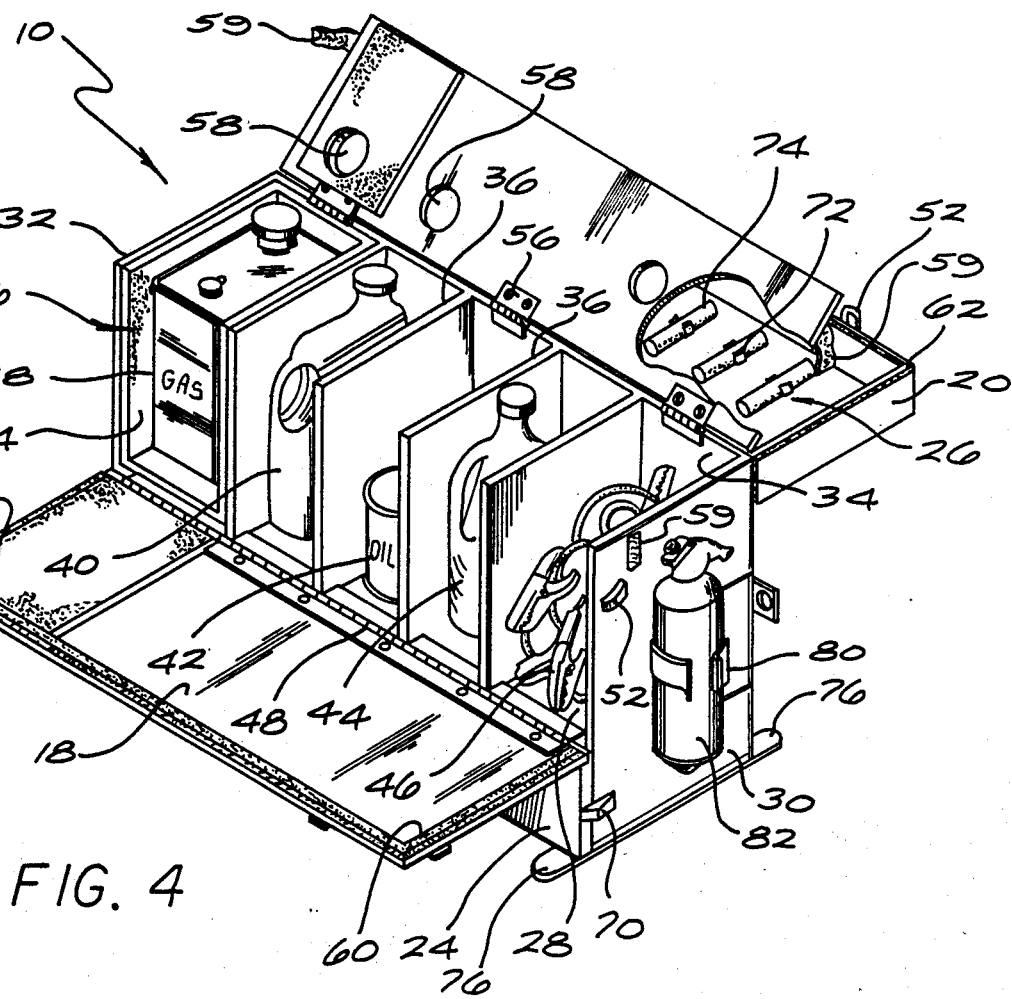

UTILITY CHEST FOR VEHICLES

BACKGROUND OF THE INVENTION

This invention relates generally to storage devices and systems for containing emergency supplies of a type occasionally required by automotive vehicles. More particularly, this invention relates to a compact and space efficient utility chest adapted to receive and store a range of emergency supply items within the trunk of a standard passenger vehicle or the like.

Utility chests for use with automotive vehicles are generally known in the art for receiving and storing tools and/or emergency supply items. In the past, such utility chests have been designed primarily for use with trucks, such as emergency tow trucks and the like, to provide the vehicle operator with immediate access to a range of tools and emergency supply items. For example, in a roadside emergency situation, a variety of different supply items may be necessary or desirable for safety and/or repair purposes. Typical emergency supply items include fuel, oil, coolant, water, battery jumper cables, safety flares, a fire extinguisher, first aid kit, etc.

Standard passenger automobiles have not been designed to carry any significant number of emergency supply items. This fact is due in part to the relatively minimal trunk storage space provided with many modern downsized passenger vehicles. Nevertheless, in anticipation of occasional roadside emergencies, many vehicle owners tend to stock and carry selected emergency supply items. Unfortunately, such emergency items are normally stored within the trunk and/or at other locations within the vehicle in a loose, unorganized fashion. Storage chests of the type used with trucks and other larger vehicles have generally been incompatible with the trunk space limitations in a passenger vehicle.

Unorganized storage of emergency supply items within the trunk of a passenger vehicle creates a variety of potential problems and safety hazards. For example, randomly stored supply items can be difficult to find in the event of an actual emergency. Moreover, liquid storage vessels for fuel, oil, coolant and the like can encounter leakage to create a fire hazard and/or undesirably cause damage to the vehicle trunk and its contents. These hazards are compounded when the liquid vessels are unrestrained against shifting about within the trunk in the course of normal driving movements.

There exists, therefore, a significant need for a compact storage device adapted to fit into the compact trunk space of a standard passenger vehicle or the like, wherein the storage device is designed for safe and organized storage of a wide variety of emergency supply items. The present invention fulfills these needs and provides further related advantages.

SUMMARY OF THE INVENTION

In accordance with the invention, a compact utility chest is provided for receiving and storing emergency supply items within the trunk of a standard passenger automobile or the like. The utility chest includes a plurality of partitioned subcompartments for safe and secure reception of liquid containers having fuel, oil, coolant, etc., stored therein. In addition, the utility chest includes means for compact reception and storage of a wide range of additional emergency supply items such as tools, safety flares, etc. The entire chest has a compact and space efficient size and shape adapted for stable placement and/or tie-down retention within the trunk of a passenger vehicle.

The utility chest comprises a compact housing of generally rectangular cross-section. The housing defines a main storage compartment which is subdivided by internal partitions into a plurality of individual subcompartments. These subcompartments are adapted to receive and store relatively large supply items, such as liquid containers having fuel, oil, coolant, drinking water, etc., contained therein. Battery jumper cables or the like may also be stored within one of the subcompartments. These subcompartments are exposed for relatively easy access through a hinged upper lid and a hinged front panel of the housing. A hinged inner lid is also provided for removably covering the subcompartments and includes preformed apertures positioned to receive the neck and cap of a liquid container placed into an underlying subcompartment. Sealing means are desirably provided for sealing the subcompartments when the upper lid and front panel are closed. In addition, a subcomparment adapted to receive a combustible liquid such as a reserve fuel container is desirably lined with a resilient foam material.

The housing further defines a lower auxiliary compartment of generally forwardly open geometry. A tool drawer or the like is slidably received into the auxiliary compartment. Drawer dividers conveniently subdivide the tool drawer into a plurality of receptacles for receiving and storing selected hand tools and the like.

The hinged upper and inner lids of the utility chest cooperatively define an additional auxiliary compartment disposed above the main storage compartment when the hinged upper lid is closed. A plurality of spring clip fasteners or the like mounted on the underside of the upper lid conveniently supports additional supply items, such as safety flares or the like.

In accordance with further aspects of the invention, quick release fasteners such as suitcase latches or the like are provided to permit rapid opening and closing of the hinged upper lid, the front panel, and the lower tool drawer. Stabilizing means such as cord brackets and/or protruding feet may be provided for stabilizing and/or retaining the chest in a desired position within a vehicle trunk. Additional supply items such as a fire extinguisher can be mounted by means of spring clip fasteners or the like onto the exterior of the chest housing.

Other features and advantages of the present invention will become more apparent from the following detailed description, taken into conjunction with the accompanying drawings which illustrate, by way of example the principles of the invention.

BRIEF DESCRIPTION OF THE DRAWINGS

The accompanying drawings illustrate the invention. In such drawings:

FIG. 3 is a transverse vertical section taken generally on the line 3—3 of FIG. 2; and FIG. 4 is a perspective view of the chest generally similar to FIG. 2 but depicting components of the chest in an open configuration.

DETAILED DESCRIPTION OF THE PREFERRED EMBODIMENT

Figure 1:
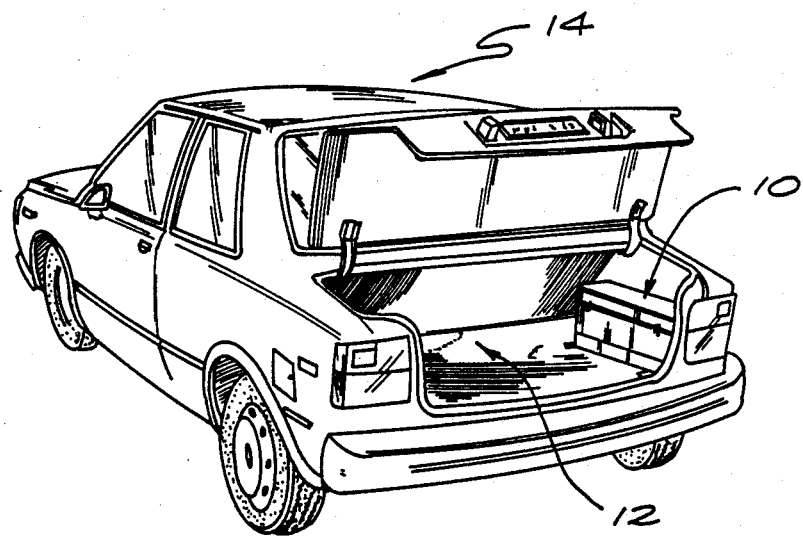
FIG. 1 is a perspective view illustrating a passenger vehicle having a utility chest embodying the novel features of the invention installed within the vehicle trunk.

As shown in the exemplary drawings, a utility chest referred to generally by the reference numeral 10 is provided for receiving and storing emergency supply items within the trunk 12 of standard passenger vehicle 14 or the like, as viewed in FIG. 1. The utility chest 10 is designed for organized storage of a relatively large number of tools and other items which may be required upon occurrence of a roadside emergency situation. Such supply items particularly include liquid storage vessels for carrying reserve supplies of fuel, coolant, etc.

The utility chest 10 of the present invention has a compact size and shape for relatively unobstrusive placement into the trunk 12 of a standard passenger vehicle 14. As viewed in FIG. 1, the chest 10 may be placed at one side of the trunk volume alongside a rear fender for the vehicle. In this position, the chest occupies a relatively small portion of the trunk volume and does not interfere with normal access to the vehicle trunk for storage and/or retrieval of luggage and other items. Importantly, the chest 10 defines a compact arrangement of storage compartments and chambers for receiving a relatively broad range of emergency supply items of a general type required in mechanical breakdown or other roadside emergency situations.

Figure 2:
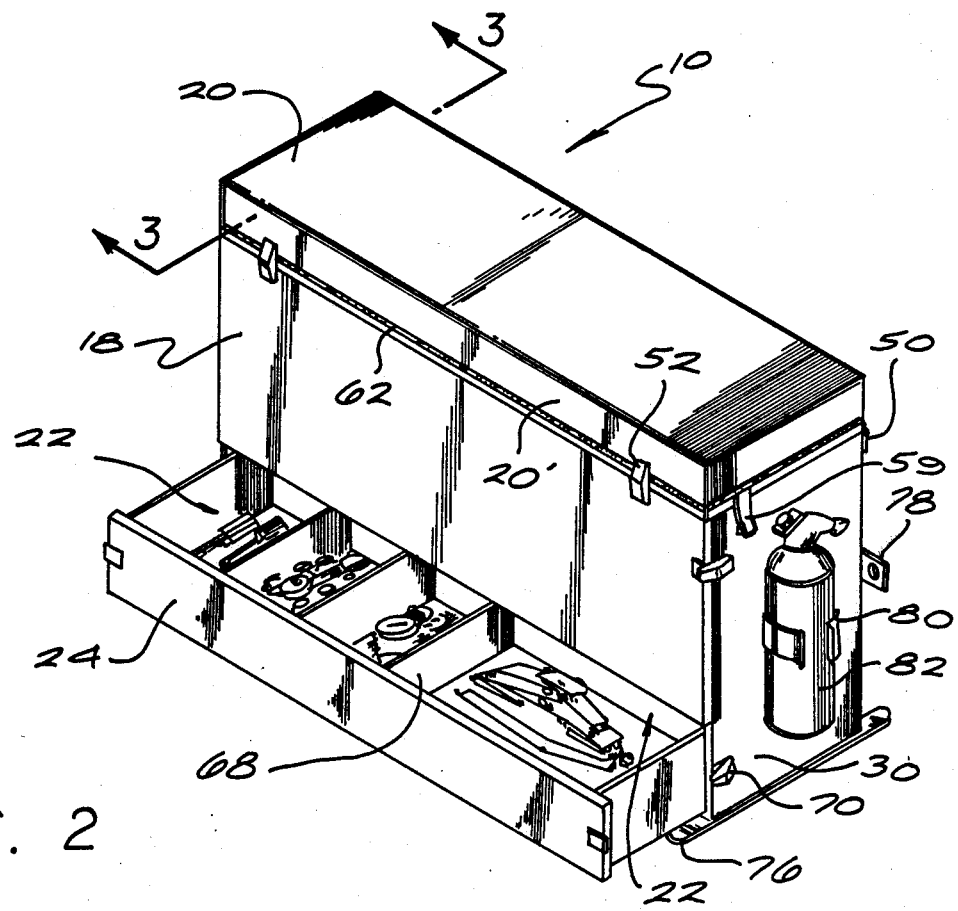
FIG. 2 is an enlarged perspective view illustrating the utility chest of FIG. 1.

As viewed best in FIGS. 2-4, the utility chest 10 comprises a compact housing of generally rectangular configuration which is constructed from a combination of rigidly interconnected and hingedly interconnected panels. In a preferred form, the various housing panels are constructed from a durable yet lightweight plastic material, although other panel materials may be used, as desired. In general terms, the various panels forming the chest housing are arranged to subdivide the housing interior into a main storage compartment 16 (FIG. 4) adapted to receive and store relatively large supply items such as liquid storage vessels, as will be described in more detail. This main storage compartment is accessible from the front of the chest and/or from above by means of a hinged front panel 18 and a hinged upper lid 20, respectively. A lower auxiliary storage compartment 22 (FIGS. 2 and 3) is formed underneath the main compartment 16 for receiving a storage drawer 24, and the hinged upper lid 20 is shaped to define an upper auxiliary storage compartment 26 (FIG. 3).

More specifically, with reference to FIGS. 3 & 4, the chest housing includes a main platform 28 forming a floor for the main storage compartment 16. The platform 28 extends between a pair of side walls 30 and 32, and further cooperates with a rear wall 34 to define the upwardly and forwardly open main storage compartment 16. Importantly, as viewed in FIG. 4, this main storage compartment is subdivided into a plurality of individual subcompartments by a series of spaced upright partitions 36.

The individual subcompartments are adapted to receive and store relatively large supply items, particularly such as different types of liquid storage vessels. For example, as shown in the illustrative drawings, a reserve fuel container 38 may be received within one of the subcompartments. Additional subcompartments may receive individual containers such as an engine coolant bottle 40, one or more cans of oil 42, and/or a bottle 44 containing emergency drinking water. Additional storage compartments, if provided, may receive relatively large supply items, such as the jumper cables 46 shown in FIG. 4.

The various items stored within the main compartment 16 are accessed quickly and easily through the hinged front panel 18 and the hinged upper lid 20. More specifically, the front panel 18 is fastened by an elongated hinge 48 to the front margin of the main platform 28. Similarly, the hinged upper lid 20 is fastened by a hinge 50 or the like to the upper margin of the rear housing wall 34 (FIG. 3). These hinged panels 18 and 20 are thus movable between open positions (FIG. 4) and closed positions (FIGS. 2 and 3) for respectively permitting access to or closing the main storage compartment 16. Convenient quick release latches 52 such as suitcase latches or the like are provided for releasably locking the hinge panels 18 and 20 in the closed positions. For example, a pair of latches 52 may be provided for securing the front panel 18 to the opposite side walls 30 and 32, and an additional pair of latches 52 may be provided for locking the hinged upper lid 20 to the closed front panel 18 (FIG. 2).

The utility chest 10 beneficially incorporates additional safety features for insuring stable and safe storage of the various items within the main compartment 16. In particular, as shown best in FIGS. 3 and 4, a hinged inner lid 54 is also provided to fold over and close the upper portion of the main compartment 16. The hinged inner lid 54 is connected by hinges 56 or the like. Preformed apertures 58 within the inner lid 54 are positioned to receive the neck and cap 57 of liquid storage vessels within the various subcompartments. Accordingly, when the hinged inner lid 54 is closed, the lid 54 locks with liquid vessels in the main compartment 16 to prevent those vessels from shifting or otherwise moving about during normal vehicle operation. Fastener straps 59 such as Velcro straps or the like are provided to releasably retain the inner lid in the closed position.

The utility chest 10 further incorporates seal means for substantially sealing the main storage compartment 16 when the various hinged panel components are closed and locked. In this regard, the front panel 18 includes a peripheral inboard seal gasket 60 adapted to engage forward edges of the side walls 30 and 32 and to engage the hinged inter lid 54. Similarly, the hinged upper lid 20 includes a seal gasket 62 for engaging the upper margins of the side walls 30 and 32, the rear wall 34, and the closed front panel 18. Moreover, for added safety, one or more of the subcompartments may be lined with a resilient foam material 64 to cushion stored items against shock. The use of such foam lining is particularly desirable with subcompartments containing volatile substances, such as reserve fuel.

The lower auxiliary storage compartment 22 is located directly beneath the main platform 28. This lower compartment 22 is defined by a bottom wall 66 of the housing in cooperation with downwardly projecting portions of the side walls 30 and 32 and the rear wall 34. The lower compartment 22 thus has a forwardly open configuration adapted for sliding reception of the shallow storage drawer 24. As viewed in FIG. 2, the drawer 24 is conveniently subdivided by internal partitions 68 into a plurality of individual chambers for receiving and storing various supply items, such as tools, spare parts, tire jack equipment, etc. Quick release latches such as suitcase fasteners 70 may be provided at the sides of the housing for releasably locking the storage drawer 24 in a closed position.

In accordance with further aspects of the invention, the hinged upper lid 20 is shaped to provide the upper auxiliary storage compartment 26 located directly above the hinged inner lid 54. That is, the upper lid 20 has a peripheral skirt 20' extending downwardly from a top wall to define a shallow chamber forming the upper compartment 26. Fastening devices such as spring clips 72 or the like are attached to the underside of the lid 20 for purposes of supporting additional emergency supply items. For example, as viewed in FIG. 4, one or more safety flares 74 may be carried by a row of the spring clips 72.

The utility chest 10 thus provides compact and organized storage for a wide range of emergency supply items, particularly inclusive of reserve fluid supplies commonly required in a passenger vehicle environment. The chest is designed for compact and generally out-of-the-way storage within the trunk 12 of the vehicle 14. Additional chest stability may be provided by protruding or extended feet 76 on the bottom wall 66 and/or with mounting brackets 78 at opposite sides of the rear wall 34. The mounting brackets 78 may be used to fasten the chest to a stable support surface by means of elastic cords or other convenient fastening apparatus. In addition, the exterior of the chest housing may include one or more fastening devices such as a spring clip 80 for carrying still further emergency items, such as a fire extinguisher 82 or the like.

A variety of further modifications and improvements to the utility chest 10 of the present invention will be apparent to those skilled in the art. Accordingly, no limitation on the invention is intended by way of the forgoing description and accompanying drawings, except as set forth in appended claims.

What is claimed is:

1. A utility chest, comprising:
   a housing defined by a plurality of interconnected panel members to form a forwardly and upwardly open main storage compartment, a forwardly open lower storage compartment disposed below said main storage compartment, and an upper storage compartment disposed above said main storage compartment;
   a front panel hingedly connected to said housing and movable between open and closed positions respectively exposing and closing the front of said main storage compartment;
   an upper lid hingedly connected to said housing and movable between open and closed positions respectively exposing and closing the top of said main storage compartment;
   a drawer slidably receivable into the lower storage compartment; and
   an inner lid hingedly connected to said housing and movable between open and closed positions respectively exposing and closing the top of the main storage compartment and cooperating with said upper lid to define said upper storage compartment, said inner lid having at least one aperture formed therein for receiving the neck portion of a storage vessel within the main storage compartment.

2. The utility chest of claim 1 wherein said housing further includes at least one generally upright partition subdividing said main storage compartment into a plurality of subcompartments.

3. The utility chest of claim 2 wherein at least one of said subcompartments is lined with a resilient material.

4. The utility chest of claim 1 further including fastener means for releasably fastening said inner lid in the closed position.

5. The utility chest of claim 1 further including fastener means for releasably fastening said upper lid in the closed position.

6. The utility chest of claim 1 further including fastener means for releasably fastening said front panel in the closed position.

7. The utility chest of claim 1 further including outwardly protruding feet on said housing.

8. The utility chest of claim 1 further including at least one mounting bracket on said housing.

9. The utility chest of claim 1 further including at least one fastener member within the upper storage compartment for releasably retaining an emergency supply item.

10. The utility chest of claim 1 further including at least one fastener member on the exterior of said housing for releasably retaining an emergency supply item.

11. The utility chest of claim 1 wherein said front panel further includes seal means for substantially sealed engagement with said housing when said front panel is in said closed position.

12. The utility chest of claim 1 wherein said upper lid further includes seal means for substantially sealed engagement with said housing when said upper lid is in said closed position.

13. A utility chest, comprising:
   a housing defined by a plurality of panel members interconnected to form a forwardly and upwardly open main storage compartment subdivided into a plurality of subcompartments, and a forwardly open lower storage compartment below said main storage compartment;
   said housing further including a front panel hingedly movable between open and closed positions for respectively exposing and closing the front of the main storage compartment;
   fastener means for releasably locking said front panel in the closed position;
   said housing further including an inner lid hingedly movable between open and closed positions for respectively exposing and closing the top of the main storage compartment, said inner lid having at least one aperture formed therein for receiving the neck portion of a liquid storage vessel within the main storage compartment;
   said housing further including an upper lid hingedly movable between open and closed positions respectively pivoted away from and overlying the main storage compartment, said upper lid cooperating with said inner lid to define an upper storage compartment above the main storage compartment when said upper and inner lids are in the closed positions; and
   fastener means for releasably locking said upper lid and said inner lid in the closed positions.

14. The utility chest of claim 13 further including a drawer slidably receivable into the lower storage compartment.

15. The utility chest of claim 13 wherein at least one of said subcompartments is lined with a resilient material.

16. The utility chest of claim 13 further including at least one fastener member on the exterior of said housing for releasably retaining an emergency supply item.

17. The utility chest of claim 13 further including at least one fastener member within the upper storage compartment for releasably retaining an emergency supply item.

* * * * *